(12) United States Patent
Reed (10) Patent No.: US 9,835,046 B2
(45) Date of Patent: Dec. 5, 2017

(54) GAS TURBINE ENGINE

(71) Applicant: ROLLS-ROYCE PLC, London (GB)

(72) Inventor: Julian Mark Reed, Derby (GB)

(73) Assignee: ROLLS-ROYCE plc, London (GB)

( * ) Notice: Subject to any disclaimer, the term of this patent is extended or adjusted under 35 U.S.C. 154(b) by 357 days.

(21) Appl. No.: 14/608,833

(22) Filed: Jan. 29, 2015

(65) Prior Publication Data
US 2015/0233262 A1    Aug. 20, 2015

(30) Foreign Application Priority Data
Feb. 14, 2014    (GB) .................................. 1402577.9

(51) Int. Cl.
| | |
|---|---|
| *F01B 25/16* | (2006.01) |
| *F01D 21/04* | (2006.01) |
| *F01D 25/24* | (2006.01) |

(52) U.S. Cl.
CPC .......... *F01D 21/045* (2013.01); *F01D 25/246* (2013.01); *F05D 2220/36* (2013.01); *F05D 2250/294* (2013.01); *F05D 2260/36* (2013.01); *Y02T 50/671* (2013.01)

(58) Field of Classification Search
CPC .. F01D 21/045; F01D 25/246; F05D 2220/36; F05D 2250/294; F05D 2260/36; Y02T 50/671
USPC .......................................................... 415/9
See application file for complete search history.

(56) References Cited

U.S. PATENT DOCUMENTS

| | | | | |
|---|---|---|---|---|
| 5,267,828 | A | * | 12/1993 | Lenhart ................. F01D 25/246 411/353 |
| 5,885,056 | A | * | 3/1999 | Goodwin .............. F01D 21/045 415/200 |
| 2005/0089391 | A1 | * | 4/2005 | Stretton ................ F01D 21/045 415/9 |
| 2005/0271503 | A1 | | 12/2005 | Harper et al. |
| 2011/0044807 | A1 | * | 2/2011 | Bottome ................. F01D 11/08 415/196 |

(Continued)

FOREIGN PATENT DOCUMENTS

EP    3095961 A1 *  11/2016  ............... F01D 9/02

OTHER PUBLICATIONS

Sep. 26, 2014 Search Report issued in British Application No. 1402577.9.

*Primary Examiner* — Jessica Cahill
(74) *Attorney, Agent, or Firm* — Oliff PLC (57) ABSTRACT

A fan containment system for fitment around an array of radially extending fan blades mounted on a hub in an axial gas turbine engine, including: a fan case having an annular casing element for encircling an array of fan blades and an annular fan track liner lining a radially inner side of the casing element, including a first fan track liner panel positioned circumferentially adjacent a second fan track liner panel. An engagement arrangement engages the first fan track liner panel to the second, extending along at least a portion of adjacent sides of the liner panels, and is configured and the liner panels are shaped such that axial movement of the first fan track liner panel by a distance less than the length of the engagement arrangement, being measured in a direction parallel to the adjacent sides of the liner panels, disengages the first liner panel from the second.

20 Claims, 7 Drawing Sheets

(56) References Cited

U.S. PATENT DOCUMENTS

2012/0134774 A1\* 5/2012 Clark ................ B65D 43/0222
415/9

\* cited by examiner

GAS TURBINE ENGINE

FIELD OF INVENTION

The present disclosure relates to a fan containment system, a casing assembly, a fan and/or a gas turbine engine.

BACKGROUND

Turbofan gas turbine engines (which may be referred to simply as 'turbofans') are typically employed to power aircraft. Turbofans are particularly useful on commercial aircraft where fuel consumption is a primary concern. Typically a turbofan gas turbine engine will comprise an axial fan driven by an engine core. The engine core is generally made up of one or more turbines which drive respective compressors via coaxial shafts. The fan is usually driven directly off an additional lower pressure turbine in the engine core.

To satisfy regulatory requirements, such engines are required to demonstrate that if part or all of a fan blade were to become detached from the remainder of the fan, that the detached parts are suitably captured within the engine containment system.

The fan is radially surrounded by a fan casing. It is known to provide the fan casing with a fan track liner and a containment system designed to contain any released blades or associated debris. Often, the fan track liner can form part of the fan containment system.

The fan track liner typically includes an annular layer of abradable material which surrounds the fan blades. During operation of the engine, the fan blades rotate freely within the fan track liner. At their maximum extension of movement and/or creep, or during an extreme event, the blades may cut a path into this abradable layer creating a seal against the fan casing and minimising air leakage around the blade tips.

An operational requirement of the fan track liner is that it is resistant to ice impact loads. In recent years there has been a trend towards the use of lighter fan blades, which are typically either of hollow metal or of composite construction. These lighter fan blades have similar impact energy per unit area as an ice sheet, which makes it more difficult to devise a casing arrangement that will resist the passage of ice and yet not interfere with the trajectory of a released fan blade.

Figure 1:
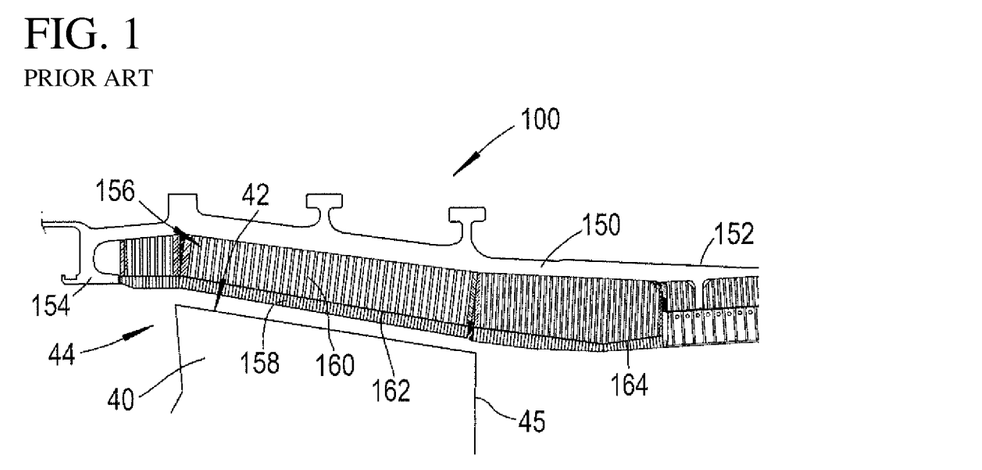
FIG. 1 is a partial view of a cross-section through a typical fan case arrangement of a gas turbine engine of the prior art.

A conventional fan containment system or arrangement 100 is illustrated in FIG. 1 and surrounds a fan comprising an array of radially extending fan blades 40. Each fan blade 40 has a leading edge 44, a trailing edge 45 and fan blade tip 42. The fan containment arrangement 100 comprises a fan case 150. The fan case 150 has a generally frustoconical or cylindrical annular casing element 152 and a hook 154. The hook 154 is positioned axially forward of an array of radially extending fan blades 40. A fan track liner 156 is mechanically fixed or directly bonded to the fan case 150. The fan track liner 156 may be adhesively bonded to the fan case 150. The fan track liner 156 is provided as a structural filler to bridge a deliberate gap provided between the fan case 150 and the fan blade tip 42.

The fan track liner 156 has, in circumferential layers, an attrition liner 158 (also referred to as an abradable liner or an abradable layer), an intermediate layer which in this embodiment is a honeycomb layer 160, and a septum 162. The septum layer 162 acts as a bonding, separation, and load spreading layer between the attrition liner 158 and the honeycomb layer 160. The honeycomb layer 160 may be an aluminium honeycomb. The tips 42 of the fan blades 40 are intended to pass as close as possible to the attrition liner 158 when rotating. The attrition liner 158 is therefore designed to be abraded away by the fan blade tips 42 during abnormal operational movements of the fan blade 40 and to just touch during the extreme of normal operation to ensure the gap between the rotating fan blade tips 42 and the fan track liner 156 is as small as possible without wearing a trench in the attrition liner 158. During normal operations of the gas turbine engine, ordinary and expected movements of the fan blade 40 rotational envelope cause abrasion of the attrition liner 158. This allows the best possible seal between the fan blades 40 and the fan track liner 156 and so improves the effectiveness of the fan in driving air through the engine.

The purpose of the hook 154 is to ensure that, in the event that a fan blade 40 detaches from the rotor of the fan 12, the fan blade 40 will not be ejected through the front, or intake, of the gas turbine engine. The hook 154 holds a released fan blade 40 and a trailing blade (not shown) forces the held released blade rearwards where the released blade is contained. Thus the fan blade 40 is unable to cause damage to structures outside of the gas turbine engine casings.

As can be seen from FIG. 1, for the hook 154 to function effectively, a released fan blade 40 must penetrate the attrition liner 158 in order for its forward trajectory to intercept with the hook. If the attrition liner 158 is too hard then the released fan blade 40 may not sufficiently crush the fan track liner 156.

However, the fan track liner 156 must also be stiff enough to withstand the rigours of normal operation without sustaining damage. This means the fan track liner 156 must be strong enough to withstand ice and other foreign object impacts without exhibiting damage for example. Thus there is a design conflict, where on one hand the fan track liner 156 must be hard enough to remain undamaged during normal operation, for example when subjected to ice impacts, and on the other hand allow the tip 42 of the fan blade 40 to penetrate the attrition liner 158. It is a problem of balance in making the fan track liner 156 sufficiently hard enough to sustain foreign object impact, whilst at the same time, not be so hard as to alter the preferred hook-interception trajectory of a fan blade 40 released from the rotor. Ice that impacts the fan casing rearwards of the blade position is resisted by an ice impact panel 164.

Figure 2:
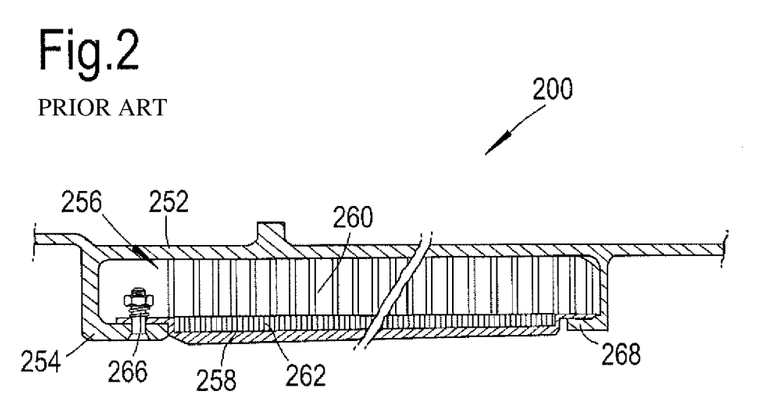
FIG. 2 is a partial view of a cross-section through an alternative fan case arrangement of a gas turbine engine of the prior art.

An alternative fan containment system is indicated generally at 200 in FIG. 2. The fan containment system 200 includes a fan track liner 256 that is connected to the fan casing 250 at both an axially forward position and an axially rearward position. At the axially forward position, the fan track liner is connected to the casing at hook 254 via a sprung fastener 266. In the event of a fan blade detaching from the remainder of the fan, the fan blade impacts the fan track liner 256 and the fan track liner pivots about the rearward position of attachment to the casing (indicated at 268 in FIG. 2).

Figure 3:
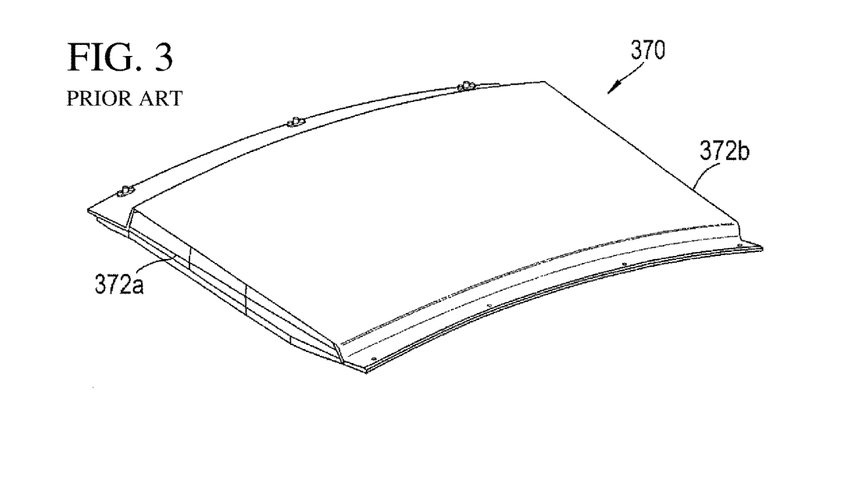
FIG. 3 is a perspective view from a non-gas-washed surface of a fan track liner panel of the prior art.

The fan track liner may be formed of a plurality of arcuate panels positioned substantially coaxially so as to form a cylindrical or frustoconical fan track liner. A fan track liner panel of the prior art is indicated generally at 370 in FIG. 3. The fan track liner panel 370 includes straight edges 372a, 372b in the axial direction.

When the fan containment system has a trap door arrangement, the trajectory of a released fan blade or a released part of a fan blade (reference to a released fan blade from hereon in refers to both a released fan blade and a released part of a fan blade) can cross the boundary from one fan track liner panel to another. When a fan blade is released the trap door of a first fan track liner panel will be activated. However, the trap door of adjacent fan track liner panels will remain closed unless a sufficient force is applied to open them. This means that a step is present between the fan track liner panel where the trap door has been activated and the fan track liner panel where the trap door has not yet been activated. The step creates a barrier to a released fan blade, so there is a concern that the released fan blade may skip over the hook and avoid containment.

A contemplated solution to this problem is to adhesively bond adjacent panels together. However, the use of adhesive creates problems for both assembly and on-wing repair. An advantage of providing a fan track liner made from a plurality of panels is that liner damage can be quickly and effectively addressed whilst the engine is on-wing with minimum disruption. If an adhesive is used this advantage is reduced because of the need to remove adhesive from the panels and wait for adhesive to cure once repair work is complete.

SUMMARY OF INVENTION

The present disclosure seeks to address one or more of the problems associated with fan containment systems of gas turbine engines of the prior art.

A first aspect of the disclosure provides a fan containment system for fitment around an array of radially extending fan blades mounted on a hub in an axial gas turbine engine. The fan containment system comprises a fan case having an annular casing element for encircling an array of fan blades. The fan case may include a hook projecting in a generally radially inward direction from the annular casing element and positioned axially forward of an array of fan blades when the fan containment system is fitted around said fan blades. The fan containment system has an annular fan track liner comprising a first fan track liner panel positioned circumferentially adjacent a second fan track liner panel. In exemplary embodiments, each of the first and second fan track liner panels may be connected to the fan case at the hook via one or more connectors configured to permit movement of the respective first or second fan track liner panel relative to the hook such that the first and/or second fan track liner panel can pivot towards the annular casing element when a released fan blade impacts the first and/or second fan track liner panel.

An engagement arrangement may engage the first fan track liner panel to the second fan track liner panel, the engagement arrangement extending along at least a portion of adjacent sides of the first and second fan track liner panels. The engagement arrangement may be configured and the first and second fan track liner panels may be shaped such that axial movement of the first fan track liner panel by a distance less than the length of the engagement arrangement disengages the first fan track liner panel from the second fan track liner panel. The length of the engagement arrangement being measured in a direction parallel to the adjacent sides of the first and second fan track liner panels Engagement of the first fan track liner panel with the second fan track liner panel can improve performance of the fan containment system. In the event of a fan blade being released from the fan and impacting the first or second fan track liner panel, the respective fan track liner panel will pivot towards the annular casing element. The respective fan track liner panel will also apply an initial force to the adjacent fan track liner panel via the engagement arrangement. This initial force is sufficient to improve the likelihood of the adjacent fan track liner panel pivoting towards the annular casing element if the fan blade trajectory crosses to the adjacent fan track liner panel.

The configuration of the engagement arrangement and the shape of the fan track liner panels advantageously ease assembly of the fan containment system and eases removal of the first and/or second fan track liner panels for maintenance work.

The first fan track liner panel may be shaped so that a region of opposing axial sides of the first fan track liner panel converge, and the second fan track liner panel is shaped so that a region of opposing axial sides of the second fan track liner panel diverge.

In the present application axial sides refer to the sides of the first and/or second fan track liner panels that extend substantially in an axial direction of the fan containment system. The axial sides may or may not be substantially axially aligned with a longitudinal axis of the fan containment system. An axial direction is a direction substantially parallel to a longitudinal axis of the fan containment system, a circumferential direction is substantially parallel to the circumference defined by the fan containment system, and a radial direction is a direction substantially parallel to a radial line from the longitudinal axis to the circumference of the fan containment system. A forward and rearward direction is defined with respect to the general direction of axial airflow through the gas turbine engine when in use.

The annular fan track liner may line a radially inner side (or surface) of the casing element. For example, the fan track liner may be arranged to be substantially coaxial with the casing element.

The opposing axial sides of the first fan track liner panel may converge in a forward region of the first fan track liner panel. The opposing axial sides of the second fan track liner panel may diverge in a forward region of the second fan track liner panel.

A rearward region of the axial sides of the first and second fan track liner panels may extend in a direction substantially parallel to a longitudinal axis of the annular fan track liner.

The forward portion of the first fan track liner panel may include opposing axial sides angled circumferentially inwardly. The forward portion of the second fan track liner panel may include opposing axial sides angled circumferentially outwardly.

The fan track liner may comprise a plurality of convergent fan track liner panels having opposing axial sides that converge in a forward region of the convergent fan track liner panel. The fan track liner may comprise a plurality of divergent fan track liner panels having opposing axial sides that diverge in a forward region of the divergent fan track liner panel. Each convergent fan track liner panel may be positioned adjacent a divergent fan track liner panel.

The hook, annular casing element and a rear support to which a rear end of the fan track liner panel is connected may define a cavity into which the fan track liner extends. A gap may be provided in the cavity between the fan track liner panel and the rear support into which the first fan track liner panel can be moved when disengaging the first fan track liner panel from the second fan track liner panel.

An axial side of the first fan track liner panel may be profiled so as to interlock with an axial side of the second fan track liner panel.

The engagement arrangement may be configured so that the first fan track liner panel interlocks with the second fan track liner panel via a male and female mating member.

Interlocking adjacent fan track liner panels via a male and female mating member has been found to further improve performance of the fan containment system and to further reduce vibration of the fan track liner panels.

A second aspect of the disclosure provides a fan containment system for fitment around an array of radially extending fan blades mounted on a hub in an axial gas turbine engine. The fan containment system comprises a fan case having an annular casing element for encircling an array of fan blades. The fan case may include a hook projecting in a generally radially inward direction from the annular casing element and positioned axially forward of an array of fan blades when the fan containment system is fitted around said fan blades. The fan containment system comprises an annular fan track liner comprising a first fan track liner panel positioned circumferentially adjacent a second fan track liner panel. In exemplary embodiments, each of the first and second fan track liner panels may be connected to the fan case at the hook via one or more attachments configured to permit movement of the respective first or second fan track liner panel relative to the hook such that the first and/or second fan track liner panel can pivot towards the annular casing element when a released fan blade impacts the first and/or second fan track liner panel. The first fan track liner panel interlocks with the second fan track liner panel via male and female mating members.

Interlocking adjacent fan track liner panels via a male and female mating member can mean that when a released fan blade impacts a fan track liner panel, the connection to the adjacent fan track liner panel means that an initial force is applied to the neighbouring fan track liner panel. As such, less force is required to pivot the neighbouring fan track liner panel (i.e. activate the trap door of the adjacent fan track liner panel) and the released fan blade is captured more effectively.

Furthermore, the provision of the male and female mating members reduces vibration of the fan track liner panels during operation of the fan. In particular, vibration due to pressure profile created as the fan blades pass the fan track liner can be reduced.

A male or female mating member may be provided on an axial side of the first and second fan track liner panels.

The male or female mating member may extend along at least a portion of a forward region of the axial side of the first and second fan track liner panels. Provision of the male and female mating members in the forward region of the fan track liner panels is particularly advantageous for ensuring a trap door of an adjacent fan track liner panel is activated when a fan blade impacts a fan track liner panel.

The first fan track liner panel may interlock with the second fan track liner panel via a tongue and groove arrangement. A tongue and groove arrangement has been found to be particularly effective. Furthermore, the use of a tongue and groove has been found to reduce the required manufacturing tolerances of fan track liner panels by allowing for a greater gap between panels.

The tongue and groove arrangement may be arranged to extend so as to be substantially aligned with a longitudinal axis of the fan track liner.

The tongue and groove arrangement may be arranged to curve in a forwards-rearwards direction. For example, the tongue and groove arrangement may be arranged to curve radially inwardly. To remove a panel from the fan track liner the panel may be slid rearward, provision of a curved tongue and groove means that the fan track liner panel also slides radially inwardly, which provides more space for removal and access to the panel.

A third aspect of the disclosure provides a fan containment system for fitment around an array of radially extending fan blades mounted on a hub in an axial gas turbine engine. The fan containment system comprises a fan case having an annular casing element for encircling an array of fan blades. The fan case may include a hook projecting in a generally radially inward direction from the annular casing element and positioned axially forward of an array of fan blades when the fan containment system is fitted around said fan blades. An annular fan track liner comprises a first fan track liner panel positioned circumferentially adjacent a second fan track liner panel. In exemplary embodiments, each of the first and second fan track liner panels may be connected to the fan case at the hook via one or more attachments configured to permit movement of the respective first or second fan track liner panel relative to the hook such that the first and/or second fan track liner panel can pivot towards the annular casing element when a released fan blade impacts the first and/or second fan track liner panel. The first fan track liner is shaped to have a convergent region and the second fan track liner is shaped to have a divergent region. The divergent region of the second fan track liner being complimentary to the convergent region of the first fan track liner.

Shaping the fan track liner panels in this way can ease removal of the first or second fan track liner panel for maintenance work.

As will be appreciated by the person skilled in the art, any one or any combination of the optional features of the first aspect may be applied to the second and third aspects and any optional features of the second aspect may be applied to the first and third aspects.

A fourth aspect of the disclosure provides a fan casing comprising the fan containment system of the first or second aspects.

A fifth aspect of the disclosure provides a fan comprising the fan containment system of the first or second aspects.

A sixth aspect of the disclosure provides a gas turbine engine comprising the fan containment system of the first or second aspects.

DESCRIPTION OF DRAWINGS

The invention will now be described, by way of example only, with reference to the accompanying drawings in which.

DETAILED DESCRIPTION

Figure 4:
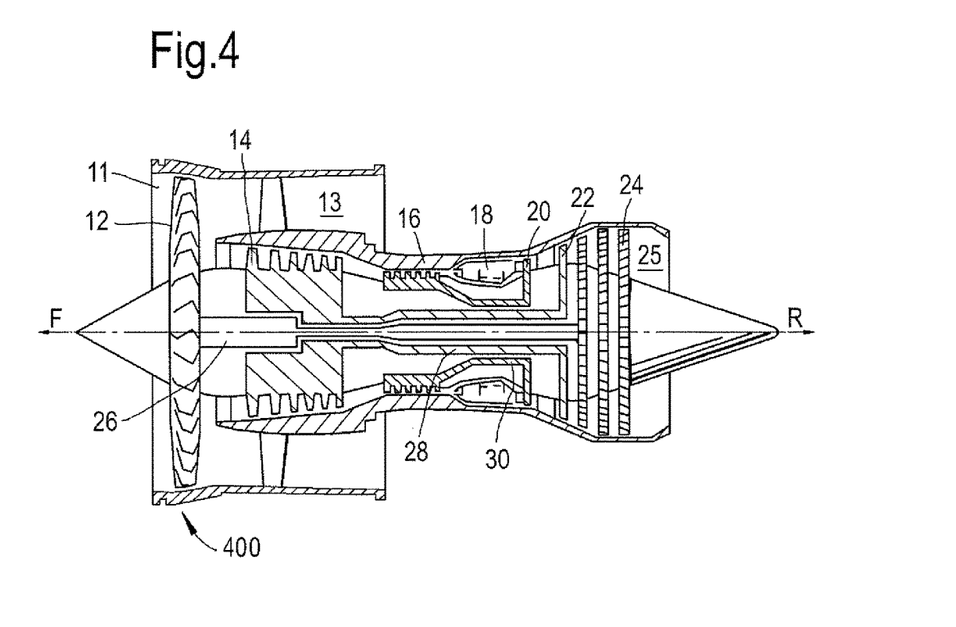
FIG. 4 is a cross-section through the rotational axis of a high-bypass gas turbine engine.

With reference to FIG. 4 a bypass gas turbine engine is indicated at 10. The engine 10 comprises, in axial flow series, an air intake duct 11, fan 12, a bypass duct 13, an intermediate pressure compressor 14, a high pressure compressor 16, a combustor 18, a high pressure turbine 20, an intermediate pressure turbine 22, a low pressure turbine 24 and an exhaust nozzle 25. The fan 12, compressors 14, 16 and turbines 18, 20, 22 all rotate about the major axis of the gas turbine engine 10 and so define the axial direction of the gas turbine engine.

Air is drawn through the air intake duct 11 by the fan 12 where it is accelerated. A significant portion of the airflow is discharged through the bypass duct 13 generating a corresponding portion of the engine thrust. The remainder is drawn through the intermediate pressure compressor 14 into what is termed the core of the engine 10 where the air is compressed. A further stage of compression takes place in the high pressure compressor 16 before the air is mixed with fuel and burned in the combustor 18. The resulting hot working fluid is discharged through the high pressure turbine 20, the intermediate pressure turbine 22 and the low pressure turbine 24 in series where work is extracted from the working fluid. The work extracted drives the intake fan 12, the intermediate pressure compressor 14 and the high pressure compressor 16 via shafts 26, 28, 30. The working fluid, which has reduced in pressure and temperature, is then expelled through the exhaust nozzle 25 generating the remainder of the engine thrust.

The intake fan 12 comprises an array of radially extending fan blades 40 that are mounted to the shaft 26. The shaft 26 may be considered a hub at the position where the fan blades 40 are mounted. FIG. 4 shows that the fan 12 is surrounded by a fan containment system 400 that also forms one wall or a part of the bypass duct 13.

In the present application a forward direction (indicated by arrow F in FIG. 4) and a rearward direction (indicated by arrow R in FIG. 4) are defined in terms of axial airflow through the engine 10.

Figure 5:
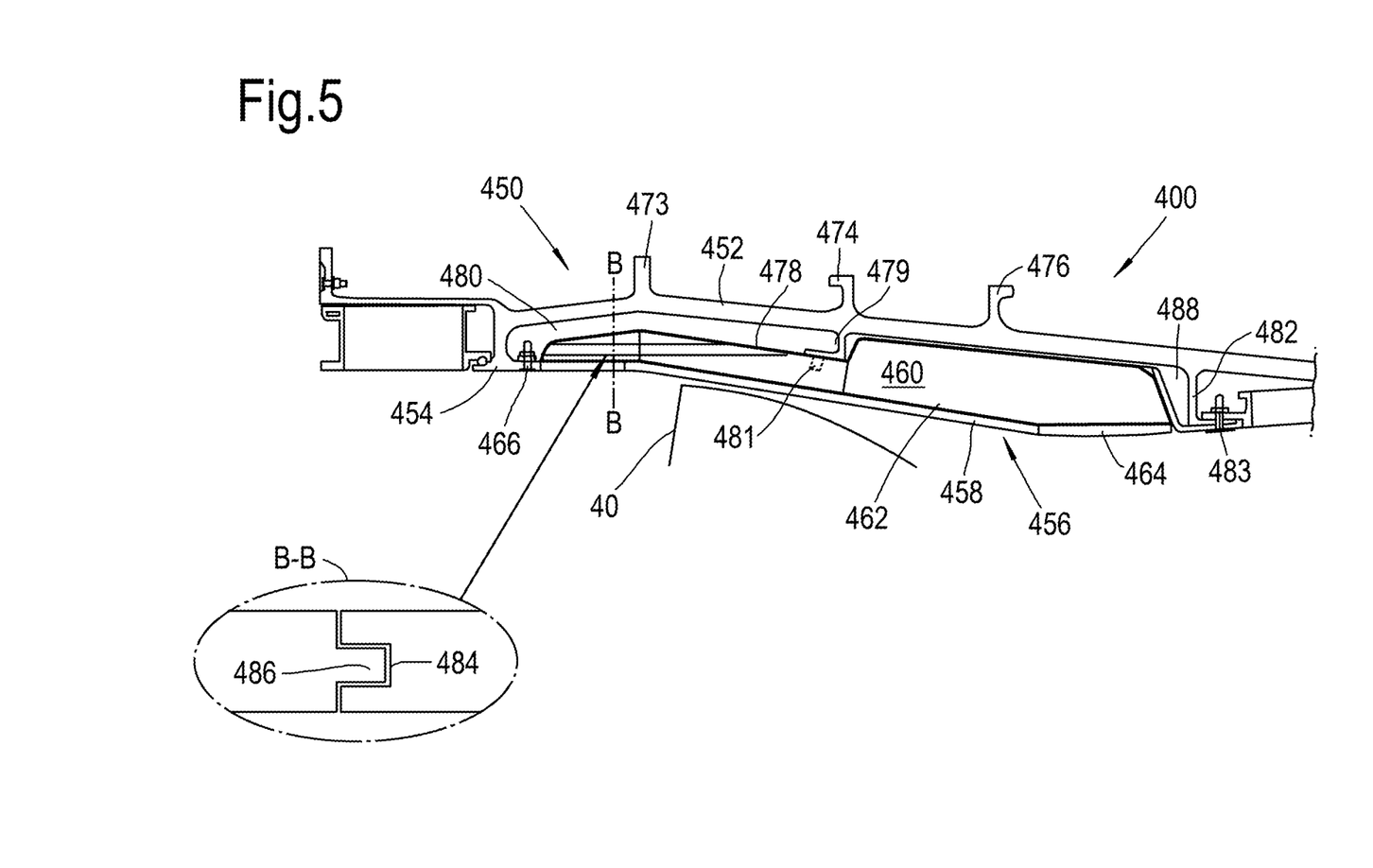
FIG. 5 is a partial cross-section through a fan blade containment system.

Referring now to FIG. 5, the fan containment system 400 is shown in more detail. The fan containment system 400 comprises a fan case 450. The fan case 450 includes an annular casing element 452 that, in use, encircles the fan blades 40 of the gas turbine engine 10. The fan case 450 further includes a hook 454 that projects from the annular casing element in a generally radially inward direction. The hook 454 is positioned, in use, axially forward of the fan blades 40 and the hook is arranged so as to extend axially inwardly, such that in a fan blade off scenario the hook 454 prevents the fan blade from exiting the engine 10 through the air intake duct 11.

In the present embodiment, the hook 454 is substantially L-shaped and has a radial component extending radially inwards from the annular casing element 452 and an axial component extending axially rearward towards the fan blades 40 from the radial component.

Circumferential ribs 473, 474 and 476 are positioned around the annular casing element 452 on a radially outer surface for stiffening the fan case 450.

A fan track liner 456 is connected to the fan case 450 at the hook 454 via a connector. The connector biases the fan track liner to a position substantially aligned with the lower end of the hook 454 and permits movement of the fan track liner relative to the hook when a pre-determined force is applied to the fan track liner. In the present embodiment, the connector includes a plurality of circumferentially spaced fasteners 466 designed to shear/fracture at a predetermined load such that movement of the fan track liner radially outwards towards the annular casing element 452 is permitted when a load exerted on the fan track liner exceeds the predetermined level (in alternative embodiments an alternative fastening mechanism may be used e.g. a crushable collar or a sprung fastener).

The fan track liner 456 includes a tray 478 to which an intermediate layer 460 is connected (e.g. bonded). An attrition layer (or abradable layer) 458 is positioned, in use, proximal to the fan blades 40. In the present embodiments, a septum layer 462 is the interface between the attrition layer and the intermediate layer, forming part of the bond between the two. The septum layer 462 also separates the attrition layer and the intermediate layer and distributes any applied load between the attrition layer and the intermediate layer. The tray 478 is connected to the hook 454 via the fastener 466 so as to connect the fan track liner 456 to the fan case 450. The attrition layer 458 has a further rearward portion 464 that is constructed to provide increased ice impact resistance (e.g. to replace a more conventional GRP ice impact panel).

A forward portion of the fan track liner 456 is spaced radially inward from the annular casing element 452 so that a voidal region 480 is formed between the forward portion of the fan track liner 456 and the casing element 452.

A standoff 479 protrudes radially inwardly from the casing element 452. The standoff is positioned axially between a forward end of the fan track liner and a rearward end of the fan track liner. Each fan track liner panel is connected to the standoff via a fastener 481, e.g. a bolt. The fastener 481 is covered by the intermediate layer 460 and/or attrition layer 458 so that the fan track liner panels have a substantially smooth gas washed surface.

A support member 482 protrudes radially inwards from the annular casing element 452. In the present embodiment, the support member 482 is formed of a series of circumferentially spaced L-shaped protrusions, but in alternative embodiments the support member may extend fully around the annular casing element (i.e. with no interruptions/spacing). A rearward end of the fan track liner 456 is connected to the support member 482. In the present embodiment, the fan track liner 456 is connected to the support member via the tray and the attrition liner using a plurality of fasteners 483. The connection and manufacturing tolerances of the annular casing to the support member is such that any step between the fan track liner and adjacent panel (e.g. acoustic panel) will be out-of-flow (i.e. stepped radially outward) so as to improve aerodynamics.

Now the fan track liner will be described in more detail with reference to FIGS. 5 to 7. The fan track liner 456 is formed of a plurality of arcuate fan track liner panels 456a, 456b, 456c and 456d positioned adjacent to each other such that an axis of each arcuate fan track liner is substantially co-axial so to form a substantially cylindrical (or in alternative embodiments a substantially frusto-conical) fan track liner.

The fan track liner panels are engaged so as to interlock with an adjacent fan track liner panel via a male and female mating member. In the described embodiment the male mating member is a tongue 486 and the female mating member is a groove 484.

In the present embodiment, a tongue is provided on both axial sides of one fan track liner panel and a groove is provided on both axial sides of another fan track liner panel, but in alternative embodiments a groove may be provided on one axial side of the fan track liner panel and a tongue may be provided on the other axial side of the fan track liner panel.

The tongue and groove are provided in a forward portion of the fan track liner, in the present embodiment forward of the standoff 479. The tongue and groove extend from a position proximal to the hook 454 towards the standoff following a path substantially axially aligned with a longitudinal axis of the fan track liner 456 (which is coincident with an axis of rotation of the fan 12).

Figure 6:
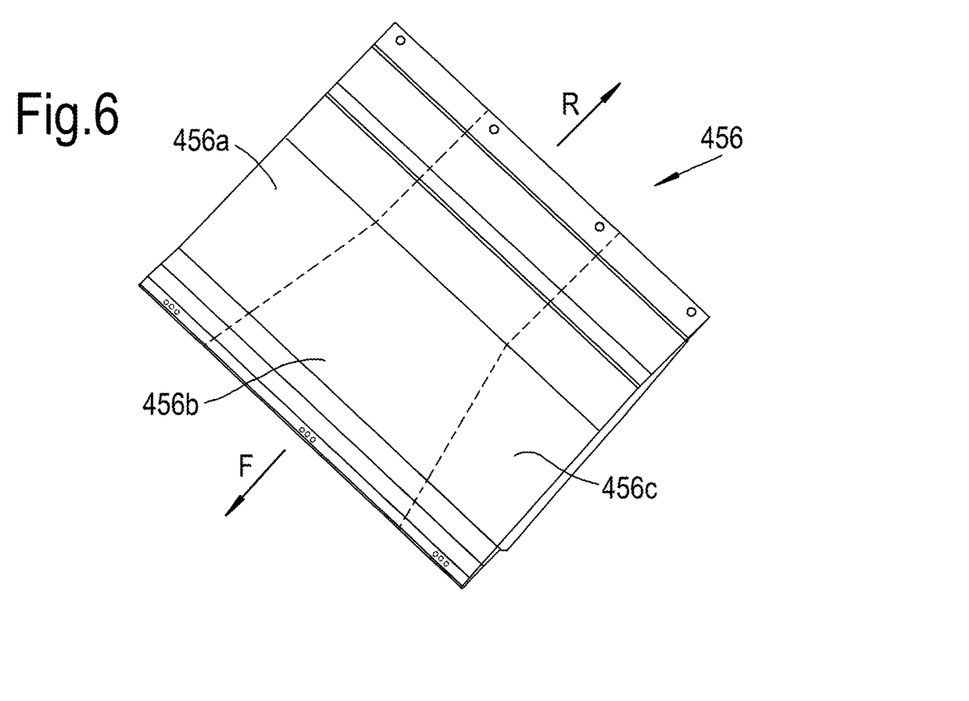
FIG. 6 is a partial plan view of a gas washed surface of a fan track liner panel of the containment system of FIG. 5.
Figure 7:
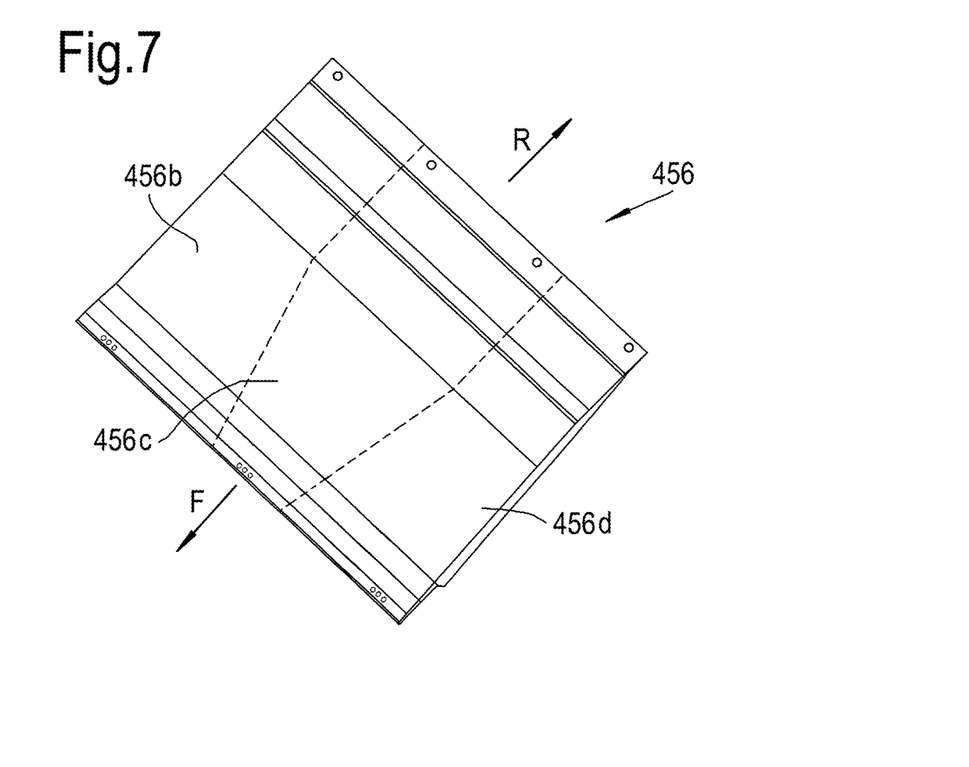
FIG. 7 is a partial plan view of a gas washed surface of a fan track liner panel of the containment system of FIG. 5.

Referring now to FIGS. 6 and 7, the fan track liner panels 456, 456b, 456c and 456d are shaped so that a forward region of the fan track liner panels is either convergent or divergent, with the divergent fan track liner panels 456b, 456d being positioned between the convergent fan track liner panels 456a, 456c.

The divergent fan track liner panels 456b, 456d include axial sides that are angled circumferentially outwardly from a position proximal to the standoff 479 (shown in FIG. 5) to an edge of the fan track liner panel adjacent the hook 454 (shown in FIG. 5) so as to form a divergent wedge shape in a forward region of the divergent fan track liner panels. A rearward region of the axial sides of the divergent fan track liner panel extends in a direction substantially parallel with an axis of rotation of the fan 12.

The convergent fan track liner panels 456a, 456c include axial sides that are angled circumferentially inwardly from a position proximal to the standoff 479 (shown in FIG. 5) to an edge of the fan track liner panel adjacent the hook 454 (shown in FIG. 5) so as to form a convergent wedge shape in a forward region of the convergent fan track liner panels. A rearward region of the axial sides of the convergent fan track liner panel extends in a direction substantially parallel with an axis of rotation of the fan 12.

The hook 454, annular casing element 452 and the rear support 482 define a cavity into which the fan track liner panel extends. The fan track liner is dimensioned such that a gap 488 is provided between the fan track liner panels and the support 482.

During operation of a gas turbine engine, one or more of the fan track liner panels may need removing, for example to replace the fan track liner panel or to repair any damage to the fan track liner panel. When the fan track liner panel is a convergent panel 456a, 456c the panel is removed by releasing the corresponding fasteners 466 at the hook 454, the corresponding fasteners 481 at the standoff 479 and the corresponding fasteners 483 at the rear support 482. The fan track liner panel is then slid axially rearward towards the rear support and into the gap 488.

The axial movement of the fan track liner panel into the gap 488 is sufficient for the tongue to be removed from the groove. The tongue and groove extend along the forward convergent portion of the sides of the fan track liner panel, which mean they follow a path that is substantially angled in a circumferential direction. Movement of the tongue and groove in an axial direction by a distance less than the length of the tongue and groove feature in a direction of the sides of the fan track liner panel disengages the tongue from the groove and permits the convergent panel 456a, 456c to be removed from the fan track liner.

When it is desired to remove a divergent fan track liner panel, an adjacent convergent fan track liner panel can be removed which will make space for the divergent fan track liner panel to be removed.

Advantageously, the shape of the fan track liner panels means that the fan track liner can be easily assembled and a panel can be easily removed, which reduces the time and cost for production and in service maintenance.

In the event of a fan blade 40 (or part of a fan blade) being released from the hub of the fan 12, the released fan blade will impact one of the fan track liner panels 456a, 456b, 456c, 456d which substantially limits travel of the fan blade 40 in a radially outward direction relative to the fan hub. The fan blade 40 moves forwards in an axial and circumferential direction relative to the fan casing. As the fan blade 40 moves forward the attrition layer 458 is abraded and the intermediate layer 460 is compressed to absorb energy from the fan blade and slow down the speed of travel of the fan blade. Impact of the fan blade 40 with the fan track liner panel 456a, 456b, 456c, 456d also causes one or more of the fasteners 466 to fail permitting the fan track liner panel to pivot about the standoff 479 into the voidal region 480. Movement of the fan track liner, abrasion of the attrition layer and deformation of the intermediate layer means that when the released fan blade reaches the axial position of the hook 454, the released fan blade impacts the hook and is held by the hook 454 and further axially forward movement is prevented. A trailing blade then forces the held released fan blade rearwards where the released fan blade is contained.

When the fan blade impacts the fan track liner panel the interlock to the adjacent fan track liner panel via the tongue and groove means that a force is applied by the impacted fan track liner panel to the adjacent fan track liner panel. Application of this initial force reduces the force required by the fan blade to pivot a forward portion of the adjacent fan track liner panel and shear or fracture the fastener 466. Tests have shown that reducing this force enables capture of a released fan blade even when the fan blade crosses a boundary between fan track liner panels at a position close to or adjacent the hook 454.

A further advantage of the tongue and groove arrangement is that vibration of the fan track liner panels is reduced without the need to adhere adjacent panels which would be disadvantageous for ease of removal of fan track liner panels for maintenance.

Figure 8:
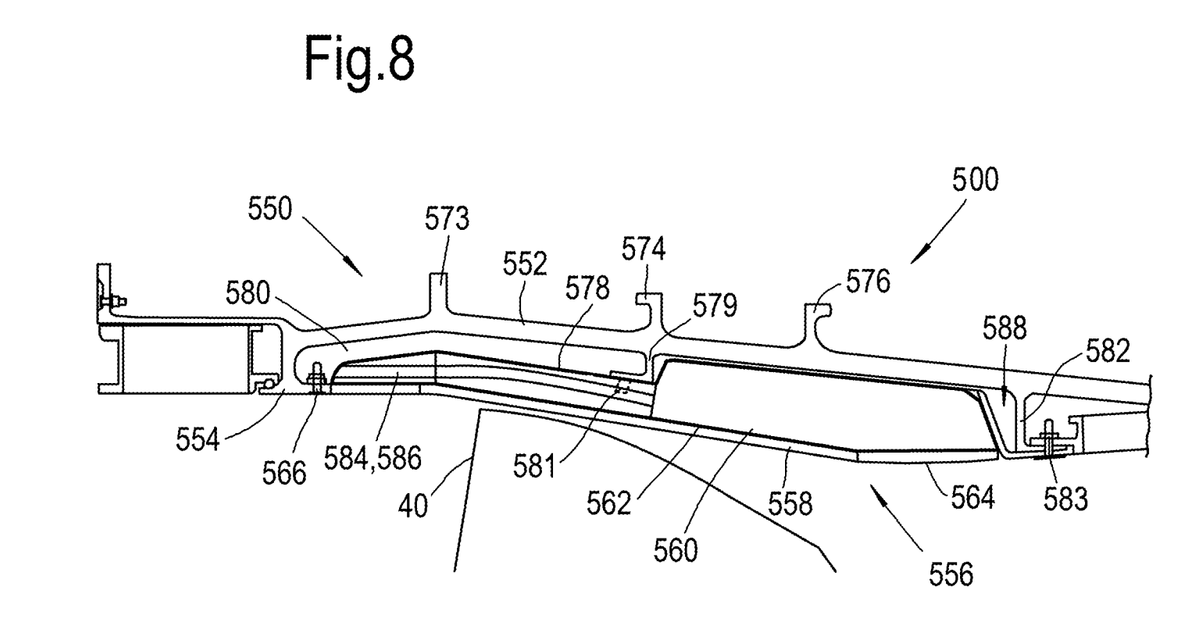
FIG. 8 is a partial cross-section through an alternative fan blade containment system.

An alternative fan containment system is shown in FIG. 8. The fan containment system 500 of FIG. 8 is similar to the fan containment system 400 of FIG. 5, and similar features are given similar reference numerals with the prefix "5" instead of "4". Only the differences between the embodiments will be discussed here.

The arrangement of the tongue and groove of the containment system of FIG. 8 is different to that previously described in that the tongue and groove follow a curved path that extends progressively radially inwardly from a position proximal to the hook 554 to a position proximal to the standoff 579. The curve of the tongue and groove means that when the convergent fan track liner panel is slid rearward it also slides radially inwardly. The curve reduces the gap 588 required for the removal of the fan track liner panel and improves access to the fan track liner panel.

It will be appreciated by one skilled in the art that, where technical features have been described in association with one embodiment, this does not preclude the combination or replacement with features from other embodiments where this is appropriate. Furthermore, equivalent modifications and variations will be apparent to those skilled in the art from this disclosure. Accordingly, the exemplary embodiments of the invention set forth above are considered to be illustrative and not limiting.

In the present embodiment the intermediate layer of the fan track liner is an aluminium honeycomb structure, but in alternative embodiments an alternative intermediate layer may be used (e.g. a foam (for example a metal or synthetic foam)) or a honeycomb structure made from a material other than aluminium (for example a meta-aramid material)). The intermediate layer of the described embodiment is formed of the same material in a radial direction. However, in alternative embodiments, the intermediate layer may be formed of one or more radial layers (e.g. sub-layers) connected together via a septum layer. The radial layers may be of different densities, so as to vary the properties of the intermediate layer in a radial direction.

In the described embodiment, the fan track liner panels are connected to the standoff, but in alternative embodiments the fan track liner panel may only be connected at the hook and rearward support. In such embodiments the fan track liner panel may include a hinged portion and/or the fan track liner may be connected the annular casing element via some other suitable mechanism.

The fan track liner panels have been described as having sides that are angled in a circumferential direction in a forward region of the fan track liner panels, but the fan track liner panels may have any suitable shape, for example the fan track liner panels may be curved.

A rearward region of the axial sides of the described fan track liner panels is substantially aligned with the axis of rotation of the fan, but in alternative embodiments the rearward region of the axial sides may be angled to the axis of rotation of the fan.

The described mechanism for the first fan track liner panel to interlock with the second fan track liner panel is the use of a tongue and groove, but in alternative embodiments an alternative mechanism may be used for example a splice joint.

Figure 9:
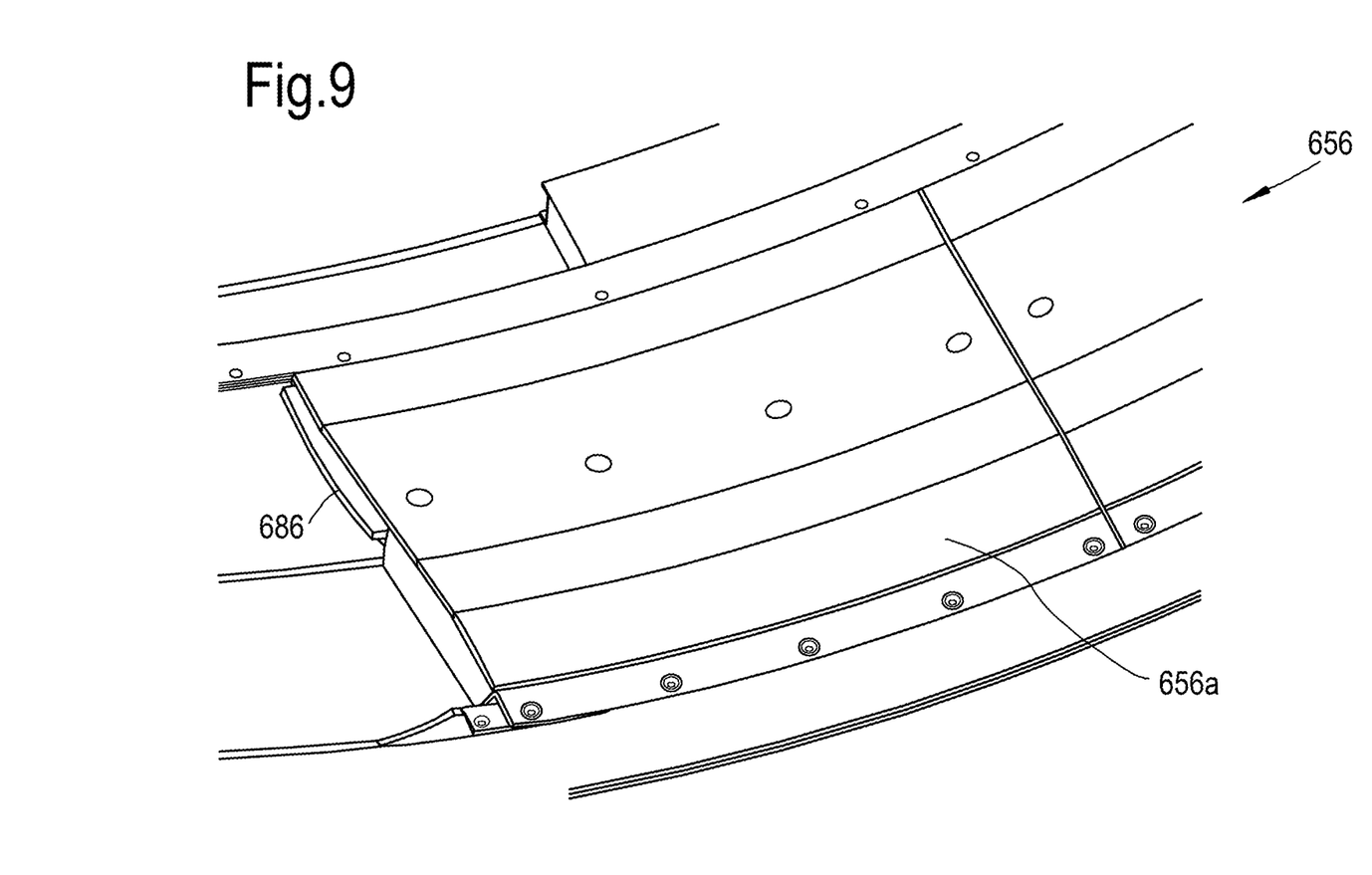
FIG. 9 is a perspective view of an alternative fan blade containment system with a fan track liner panel removed to show a tongue of one of the fan track liner panels.
Figure 10:
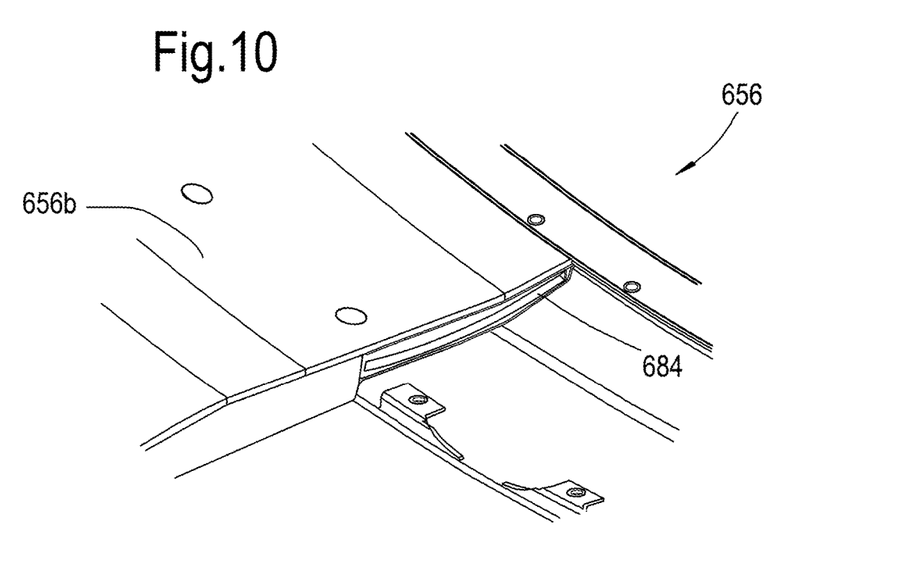
FIG. 10 is a partial perspective view of a fan track liner panel of the fan containment system of FIG. 9 showing a groove of a fan track liner panel.
Figure 11:
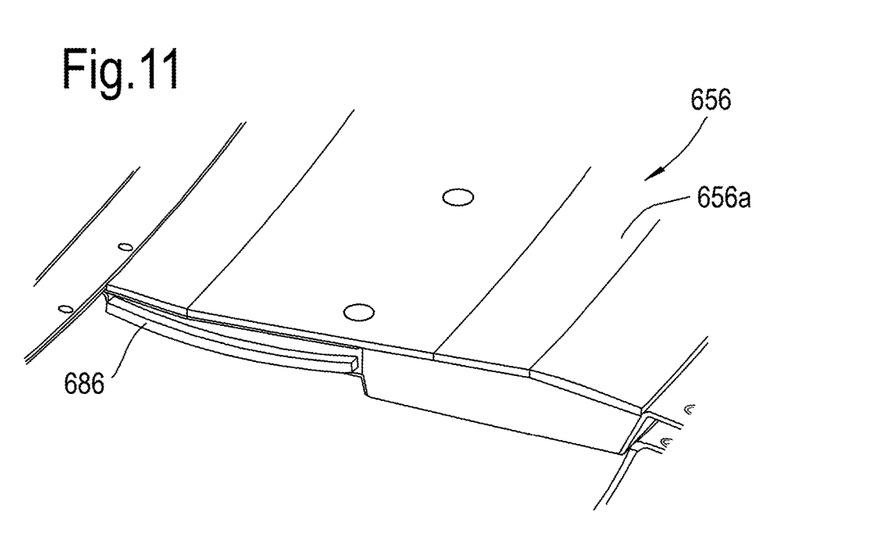
FIG. 11 is a partial perspective view of a fan track liner panel of the fan containment system of FIG. 9 showing a tongue of a fan track liner panel.

It will be appreciated by a person skilled in the art that the tongue and groove arrangement can also be advantageous for fan track liner panels having sides substantially parallel to the axis of rotation of a fan. Such an embodiment is shown in FIGS. 9 to 11, where similar features are given similar reference numerals as those previously described, but with a prefix "6" instead of "4" or "5". In such embodiments, the tongue and groove advantageously reduces vibration of the fan track liner panels and improves the likelihood of capture of a released fan blade.

The tongue and groove may extend along the forward portion of the fan track liner panel, or may extend along the full length of the fan track liner panel. In a further alternative embodiment, a tongue and groove may be provided intermittently along at least a portion of the axial sides of the fan track liner panel.

The invention claimed is:

1. A fan containment system for fitment around an array of radially extending fan blades mounted on a hub in an axial gas turbine engine, the fan containment system comprising:
   a fan case having an annular casing element for encircling an array of fan blades;
   an annular fan track liner lining a radially inner side of the casing element, the fan track liner comprising a first fan track liner panel positioned circumferentially adjacent a second fan track liner panel; and
   an engagement arrangement engaging the first fan track liner panel to the second fan track liner panel, the engagement arrangement extending for a first distance along at least a portion of adjacent sides of the first and second fan track liner panels, the first distance being in a direction parallel to the adjacent sides of the first and second fan track liner panels;
   wherein the engagement arrangement is configured, and the first and second fan track liner panels are shaped, such that movement of the first fan track liner panel along an axis of the first fan track liner panel by a second distance less than the first distance disengages the first fan track liner panel from the second fan track liner panel.

2. The fan containment system according to claim 1, wherein fan case defines a cavity into which the fan track liner extends and the fan case defines a rear support that connects to a rearward end of the fan track liner, and wherein a gap is provided in the cavity between the fan track liner panel and the rear support into which the first fan track liner panel can be moved when disengaging the first fan track liner panel from the second fan track liner panel.

3. A gas turbine engine comprising the fan containment system according to claim 1.

4. The fan containment system according to claim 1, wherein the first fan track liner panel is shaped so that axial sides of the first fan track liner panel converge in a forward direction, and the second fan track liner panel is shaped so that axial sides of the second fan track liner panel diverge in the forward direction.

5. The fan containment system according to claim 4, wherein the first fan track liner panel comprises a plurality of first fan track liner panels, and the second fan track liner panel comprises a plurality of second fan track liner panels, wherein each first fan track liner panel is positioned between two of the second fan track liner panels.

6. The fan containment system according to claim 4, wherein the axial sides of the first fan track liner panel converge in a forward region of the first fan track liner panel, and the axial sides of the second fan track liner panel diverge in a forward region of the second fan track liner panel.

7. The fan containment system according to claim 6, wherein a rearward region of the axial sides of the first and second fan track liner panels extends in a direction substantially parallel to a longitudinal axis of the annular fan track liner.

8. The fan containment system according to claim 6, wherein the forward portion of the first fan track liner panel includes opposing axial sides angled circumferentially inwardly, and the forward portion of the second fan track liner panel includes opposing axial sides angled circumferentially outwardly.

9. The fan containment system according to claim 1, wherein an axial side of the first fan track liner panel is profiled so as to interlock with an axial side of the second fan track liner panel.

10. The fan containment system according to claim 9, wherein the engagement arrangement is configured so that the first fan track liner panel interlocks with the second fan track liner panel via a male and female mating member.

11. The fan containment system according to claim 10, wherein a male or female mating member is provided on an axial side of the first and second fan track liner panels.

12. The fan containment system according to claim 11, wherein the male or female mating member extends along at least a portion of a forward region of the axial side of the first and second fan track liner panels.

13. The fan containment system according to claim 9, wherein the first fan track liner panel interlocks with the second fan track liner panel via a tongue and groove arrangement.

14. The fan containment system according to claim 13, wherein the tongue and groove arrangement is arranged to curve radially inwardly.

15. The fan containment system according to claim 13, wherein the tongue and groove arrangement is arranged to extend so as to be substantially aligned with a longitudinal axis of the fan track liner.

16. The fan containment system according to claim 15, wherein the tongue and groove arrangement is arranged to curve radially along an axial extent of the tongue and groove arrangement.

17. A fan containment system for fitment around an array of radially extending fan blades mounted on a hub in an axial gas turbine engine, the fan containment system comprising:
   a fan case having an annular casing element for encircling an array of fan blades;
   an annular fan track liner lining a radially inner side of the casing element, the fan track liner comprising a first fan track liner panel positioned circumferentially adjacent a second fan track liner panel; and
   an engagement arrangement engaging the first fan track liner panel to the second fan track liner panel, the engagement arrangement extending along at least a portion of adjacent sides of the first and second fan track liner panels; and
   wherein an axial side of the first fan track liner panel adjacent the second fan track liner panel is shaped to define a convergent region of the first fan track liner panel and an axial side of the second fan track liner panel adjacent the first fan track liner panel is shaped to define a complimentary divergent region of the second fan track liner panel.

18. The fan containment system according to claim 17, wherein the opposing axial sides of the first fan track liner panel converge in a forward region of the first fan track liner panel, and the opposing axial sides of the second fan track liner panel diverge in a forward region of the second fan track liner panel.

19. The fan containment system according to claim 18, wherein a rearward region of the axial sides of the first and second fan track liner panels extends in a direction substantially parallel to a longitudinal axis of the annular fan track liner.

20. A fan containment system for fitment around an array of radially extending fan blades mounted on a hub in an axial gas turbine engine, the fan containment system comprising:
   a fan case having an annular casing element for encircling an array of fan blades and a hook projecting in a generally radially inward direction from the annular casing element and positioned axially forward of an array of fan blades when the fan containment system is fitted around said fan blades;
   an annular fan track liner comprising a first fan track liner panel positioned circumferentially adjacent a second fan track liner panel, wherein each of the first and second fan track liner panels are connected to the fan case at the hook via one or more connectors configured to permit movement of the respective first or second fan track liner panel relative to the hook such that the first and/or second fan track liner panel can pivot towards the annular casing element when a released fan blade impacts the first and/or second fan track liner panel; and
   an engagement arrangement engaging the first fan track liner panel to the second fan track liner panel, the engagement arrangement extending along at least a portion of adjacent sides of the first and second fan track liner panels;
   wherein an axial side of the first fan track liner panel adjacent the second fan track liner panel is shaped to define a convergent region of the first fan track liner panel and an axial side of the second fan track liner panel adjacent the first fan track liner panel is shaped to define a complimentary divergent region of the second fan track liner panel.

* * * * *